United States Patent
Hamakubo et al.

(10) Patent No.: US 9,500,774 B2
(45) Date of Patent: Nov. 22, 2016

(54) PLASTIC LENS AND PRODUCTION METHOD THEREFOR

(71) Applicants: Katsushi Hamakubo, Hino (JP); Kae Ito, Hino (JP)

(72) Inventors: Katsushi Hamakubo, Hino (JP); Kae Ito, Hino (JP)

(73) Assignee: HOYA CORPORATION, Tokyo (JP)

( * ) Notice: Subject to any disclaimer, the term of this patent is extended or adjusted under 35 U.S.C. 154(b) by 0 days.

(21) Appl. No.: 14/771,102

(22) PCT Filed: Feb. 27, 2014

(86) PCT No.: PCT/JP2014/054904
§ 371 (c)(1),
(2) Date: Aug. 27, 2015

(87) PCT Pub. No.: WO2014/133087
PCT Pub. Date: Sep. 4, 2014

(65) Prior Publication Data
US 2016/0003979 A1    Jan. 7, 2016

(30) Foreign Application Priority Data
Feb. 27, 2013 (JP) .................. 2013-037854

(51) Int. Cl.
| | | |
|---|---|---|
| G02B 1/12 | (2006.01) | |
| G02B 1/04 | (2006.01) | |
| G02B 5/30 | (2006.01) | |
| G02B 1/14 | (2015.01) | |
| B32B 27/08 | (2006.01) | |
| B32B 27/20 | (2006.01) | |

(52) U.S. Cl.
CPC ............ *G02B 1/041* (2013.01); *B32B 27/08* (2013.01); *B32B 27/20* (2013.01); *G02B 1/12* (2013.01); *G02B 1/14* (2015.01); *G02B 5/3083* (2013.01); *B32B 2264/102* (2013.01); *B32B 2307/418* (2013.01); *B32B 2307/558* (2013.01); *B32B 2551/00* (2013.01)

(58) Field of Classification Search
CPC .......... G02B 1/041; G02B 1/12; G02B 1/14; G02B 1/04; G02B 5/3083; G02B 5/23; G02B 5/02; B32B 27/08; B32B 27/20; B32B 2264/002; B32B 2307/418; B32B 2551/00
See application file for complete search history.

(56) References Cited

U.S. PATENT DOCUMENTS

| | | | |
|---|---|---|---|
| 2005/0196617 A1 | 9/2005 | King | |
| 2007/0045596 A1* | 3/2007 | King ...................... | G02B 5/23 428/412 |
| 2009/0239048 A1 | 9/2009 | Sugihara et al. | |

FOREIGN PATENT DOCUMENTS

| | | |
|---|---|---|
| EP | 1 548 468 A1 | 6/2005 |
| JP | S62-11801 A | 1/1987 |
| JP | H05-142401 A | 6/1993 |
| JP | H06-51104 A | 2/1994 |
| JP | 2000-162403 A | 6/2000 |
| JP | 2005-076005 A | 3/2005 |
| JP | 2006-010829 A | 1/2006 |
| JP | 2007-520757 A | 7/2007 |
| JP | 2007-254650 A | 10/2007 |
| JP | 2009-258597 A | 11/2009 |
| JP | 2009-286924 A | 12/2009 |
| JP | 2010-024268 A | 2/2010 |
| JP | 2010-070602 A | 4/2010 |
| WO | 2013/129531 A1 | 9/2013 |

OTHER PUBLICATIONS

Jun. 30, 2015 International Preliminary Report on Patentability issued in International Patent Application No. PCT/JP2014/054904.
May 13, 2014 International Search Report issued in International Patent Application No. PCT/JP2014/054904.
Sep. 12, 2016 Search Report issued in European Patent Application No. 14757540.1.

\* cited by examiner

*Primary Examiner* — Euncha Cherry
(74) *Attorney, Agent, or Firm* — Oliff PLC

(57) ABSTRACT

To provide a plastic lens having a λ/4 layer exhibiting excellent adhesion between a plastic substrate and a hard coat layer, and a method for producing thereof. A plastic lens containing: a plastic substrate (A); a λ/4 layer (B) that is formed on the plastic substrate, is formed by curing a composition comprising a bifunctional or higher functional acrylate compound, a dendritic aliphatic compound having an acrylate group at an end thereof, and metal oxide particles, and has a thickness of from 50 to 100 nm; and a hard coat layer (C) that is formed on the λ/4 layer directly or through another layer.

5 Claims, No Drawings

PLASTIC LENS AND PRODUCTION METHOD THEREFOR

TECHNICAL FIELD

The present invention relates to a plastic lens and a method for producing thereof. More specifically, the present invention relates to a plastic lens having a λ/4 layer that is excellent in adhesion between a substrate and a hard coat layer, and a method for producing thereof.

BACKGROUND ART

A plastic lens has light weight and is excellent in impact resistance as compared to glass, but is insufficient in surface hardness, and therefore the abrasion resistance thereof is enhanced by covering the surface thereof with various kinds of hard coat layers.

A hard coat layer generally has a refractive index in a range of from 1.40 to 1.55, and a plastic lens substrate generally has a refractive index of 1.50 or more. In the case where the difference in refractive index between the hard coat layer and the plastic lens substrate is large, no problem may occur when the hard coat layer has a uniform thickness, but when the hard coat layer has an uneven thickness, interference fringes are formed to impair the appearance of the lens, which may displease the user. However, it is considerably difficult to make a hard coat layer that has a uniform thickness, from the standpoint of manufacture.

Under the circumstances, there have been proposals of providing a λ/4 layer between the hard coat layer and the substrate (see PTLs 1 to 3). The λ/4 layer has a material having a refractive index in a particular range, and has a suitable film in consideration of the wavelength of visible light corresponding to the refractive index of the material. The λ/4 layer provided may prevent interference fringes from being formed.

CITATION LIST

Patent Literatures

PTL 1: JP, 05-142401, A
PTL 2: JP, 06-051104, A
PTL 3: JP, 2000-162403, A

SUMMARY OF INVENTION

Technical Problem

PTLs 1 to 3 may prevent interference fringes from being formed in a plastic lens, but are not necessarily sufficient from the standpoint of the adhesion between the hard coat layer and the plastic substrate.

An object of the present invention is to provide a plastic lens that has a λ/4 layer and exhibits excellent adhesion between a plastic substrate and a hard coat layer, and a method for producing thereof.

Solution to Problem

As a result of earnest investigations, the present inventors have found that a λ/4 layer that uses a composition containing a particular dendritic aliphatic compound and has a particular thickness range may exhibit high adhesion even with a small thickness of 1 μm or less, and thus the present invention has been completed.

The present invention relates to the following items (1) to (5).

(1) A plastic lens containing:
  a plastic substrate (A):
  a λ/4 layer (B) that is formed on the plastic substrate, is formed by curing a composition containing a bifunctional or higher functional acrylate compound, a dendritic aliphatic compound having an acrylate group at an end thereof, and metal oxide particles, and has a thickness of from 50 to 100 nm; and
  a hard coat layer (C) that is formed on the λ/4 layer directly or through another layer.
(2) The plastic lens according to the item (1), wherein the plastic lens further contains an impact absorbing layer (D) between the λ/4 layer (B) and the hard coat layer (C).
(3) The plastic lens according to the item (1) or (2), wherein the plastic substrate (A) has a refractive index of from 1.58 to 1.76, and a difference in refractive index between the plastic substrate (A) and the λ/4 layer (B) is 0.14 or less.
(4) A method for producing a plastic lens, including the following steps (1) and (2):
  step (1): forming a λ/4 layer (B) having a thickness of from 50 to 100 nm by coating a composition containing a bifunctional or higher functional acrylate compound, a dendritic aliphatic compound having an acrylate group at an end thereof, and metal oxide particles, on a plastic substrate (A), and then curing the composition through irradiation of an ultraviolet ray; and
  step (2): forming a hard coat layer (C) on the λ/4 layer (B) formed in the step (1).
(5) The method for producing a plastic lens according to the item (4), wherein the method further includes the following step (3) between the step (1) and the step (2), and the step (2) is a step of forming the hard coat layer (C) on an impact absorbing layer (D):
  step (3): forming an impact absorbing layer (D) on the λ/4 layer (B) formed in the step (1).

Advantageous Effects of Invention

According to the present invention, a plastic lens that has a λ/4 layer and exhibits excellent adhesion between a plastic substrate and a hard coat layer, and a method for producing thereof may be provided. In other words, the λ/4 layer of the present invention may exhibit excellent adhesion even with a thickness of 1 μm or less and may prevent interference fringes from being formed.

DESCRIPTION OF EMBODIMENTS

The plastic lens of the present invention includes a plastic substrate (A), a λ/4 layer (B) that is formed on the plastic substrate, and a hard coat layer (C) that is formed on the λ/4 layer directly or through another layer.

The λ/4 layer (B) is formed by curing a composition containing a bifunctional or higher functional acrylate compound, a dendritic aliphatic compound having an acrylate group at an end thereof, and metal oxide particles, and has a thickness of from 50 to 100 nm. The λ/4 layer (B) may exhibit remarkable adhesion due to the composition thereof.

The constitutional elements of the plastic lens of the present invention will be described in detail below.

Plastic Substrate (A)

The plastic substrate (A) used in the present invention may be a plastic substrate formed of various raw materials.

The material of the plastic substrate (A) is not particularly limited, and examples thereof include a methyl methacrylate homopolymer, a copolymer of methyl methacrylate and one or more other monomers, a diethylene glycol bisallyl carbonate homopolymer, a copolymer of diethylene glycol bisallyl carbonate and one or more other monomers, a sulfur-containing copolymer, a halogen-containing copolymer, polycarbonate, polystyrene, polyvinyl chloride, unsaturated polyester, polyethylene terephthalate and polyurethane.

The refractive index of the plastic substrate (A) is not particularly limited, and for example, is preferably from 1.58 to 1.76. In particular, there is a tendency that the adhesion may be reduced when the refractive index is increased, but by using the λ/4 layer of the present invention, good adhesion may be exhibited even with a plastic substrate having a high refractive index.

The λ/4 layer of the present invention exhibits good adhesion to the hard coat layer, and therefore another layer may not be necessarily involved on the λ/4 layer. For example, in the case where the refractive index of the plastic substrate is 1.67 or more, a $TiO_2$ sol and thermoplastic and thermosetting urethane has been ordinarily used for conforming the refractive indices of the plastic substrate and a primer layer, but the $TiO_2$ sol shows a photocatalytic action and reacts with the urethane, which may deteriorate the light fastness. The λ/4 layer of the present invention provided may avoid the necessity of the primer layer, and thus higher light fastness than the ordinary lenses may be provided in the case where the plastic substrate having a refractive index of 1.67 or more is used.

λ/4 Layer (B)

The λ/4 layer (B) used in the present invention is formed by curing a composition containing a bifunctional or higher functional acrylate compound (b1), a dendritic aliphatic compound having an acrylate group at an end thereof (b2), and metal oxide particles (b3). The λ/4 layer (B) has a thickness of from 50 to 100 nm. When the thickness of the λ/4 layer (B) is less than 50 nm, the adhesion may be reduced, and interference fringes may be conspicuous, and when the thickness thereof exceeds 100 nm, interference fringes may be conspicuous. The thickness of the λ/4 layer (B) is preferably from 50 to 100 nm, and more preferably from 60 to 95 nm, from the standpoint of the reduction of interference fringes and the enhancement of the adhesion between the plastic substrate and the hard coat layer. The thickness referred herein means a physical thickness.

Bifunctional or Higher Functional Acrylate Compound (b1)

A bifunctional or higher functional acrylate compound (b1) is used in the present invention. By using the bifunctional or higher functional acrylate compound, the λ/4 layer has high hardness, has no tackiness (tack-free), and has high solvent resistance. The combination use with the component (b2) may further enhance the adhesion.

The bifunctional or high functional acrylate compound (b1) is not particularly limited as far as a bifunctional or high functional acrylate compound is contained, and the number of the functional groups contained in the bifunctional or high functional acrylate compound (b1) is preferably from 2 to 7, and more preferably 2 to 5.

The component (b1) is preferably an aliphatic polyfunctional acrylate compound containing no aromatic ring from the standpoint of the weather resistance.

Examples of the bifunctional or higher functional acrylate compound (b1) include 1,4-butanediol di(meth)acrylate, 1,6-hexanediol di(meth)acrylate, ethylene glycol di(meth)acrylate, diethylene glycol di(meth)acrylate, triethylene glycol di(meth)acrylate, tetraethylene glycol di(meth)acrylate, pentaerythritol di(meth)acrylate, pentaerythritol di(meth)acrylate monostearate, dimethylolpropane di(meth)acrylate, glycidyl ether di(meth)acrylate, caprolactone-modified di(meth)acrylate, ethylene oxide-modified di(meth)acrylate, propylene oxide-modified di(meth)acrylate, dipentaerythritol hexa(meth)acrylate, dipentaerythritol penta(meth)acrylate, dipentaerythritol tetra(meth)acrylate, dipentaerythritol tri(meth)acrylate, pentaerythritol tetra(meth)acrylate, pentaerythritol tri(meth)acrylate, trimethylolpropane tri(meth)acrylate and isocyanuric acid acrylate. Examples thereof also include an alkyl-modified (meth)acrylate, a caprolactone-modified (meth)acrylate, an ethylene oxide-modified (meth)acrylate and a propylene oxide-modified (meth)acrylate of the aforementioned compounds, (meth)acrylates of aliphatic polyols other than those described above, urethane acrylates and the like. The acrylate compound may be used solely or as a combination of two or more kinds thereof.

Preferred examples of the commercially available products of the aliphatic polyol (meth)acrylate include Aronix M-306, M-305, M-303, M-452, M-450, M-408, M-403, M-400, M-402, M-404, M-406 and M-405, produced by Toagosei Co., Ltd., and Beamset 700, 710 and 730, produced by Arakawa Chemical Industries, Ltd.

Preferred examples of the commercially available products of the urethane acrylate include Beamset 50211, 50411, 505A-6, 550B, 575 and 577, produced by Arakawa Chemical Industries, Ltd., and UX5000, produced by Nippon Kayaku Co., Ltd.

Among the compounds described above, a (meth)acrylate or a urethane acrylate of an aliphatic polyol is preferred, dipentaerythritol hexa(meth)acrylate, pentaerythritol tetra(meth)acrylate, pentaerythritol tri(meth)acrylate, trimethylolpropane tri(meth)acrylate, isocyanuric acid ethylene oxide-modified tri(meth)acrylate, and urethane acrylate are more preferred, and pentaerythritol tri(meth)acrylate and urethane acrylate are further preferred.

The term, (meth)acrylate, herein means at least one selected from acrylate and methacrylate.

Dendritic Aliphatic Compound Having Acrylate Group at End Thereof (b2)

A dendritic aliphatic compound having an acrylate group at an end thereof (b2) is used in the present invention. The dendritic aliphatic compound may proceed the curing reaction within a short period of time, thereby forming the λ/4 layer having high hardness without influence of oxygen inhibition on ultraviolet ray curing, and may suppress curing shrinkage to enhance the adhesion. The component (b2) is an aliphatic compound and contains no aromatic ring, and thus yellowing on irradiation of an ultraviolet ray may be prevented, and a hard coat layer provided may be excellent in transparency and weather resistance.

The dendritic aliphatic compound having an acrylate group at an end thereof (b2) is an aliphatic compound that contains no aromatic ring and is branched in a dendritic form, and many acrylate groups may be bonded to molecular ends due to the dendritic form, thereby exhibiting high reactivity.

The dendritic aliphatic compound having an acrylate group at an end thereof (b2) is not particularly limited, and may be used solely or as a combination of two or more kinds thereof. In the dendritic aliphatic compound, a dendrimer and a hyper branched polymer are preferred. A dendrimer is a polymer that is branched with high regularity, and the hyper branched polymer is a polymer that is branched with low regularity, both of which have low viscosity and are excellent in solvent solubility as compared to a linear polymer.

Examples of the commercially available dendrimer capable of being used as the component (b2) include Viscoat #1000 and Viscoat #1020, trade names, produced by Osaka Organic Chemical Industry, Ltd. Viscoat #1000 and Viscoat #1020 contain, as a major component, a multiple branched (dendrimer type) polyester acrylate having an acrylate group at an end thereof. Viscoat #1000 has a molecular weight of approximately from 1,000 to 2,000, and Viscoat #1020 has a molecular weight of approximately from 1,000 to 3,000.

Examples of the commercially available hyper branched polymer capable of being used as the component (b2) include STAR-501 (SIRIUS-501 AND SUBARU-501), trade names, produced by Osaka Organic Chemical Industry, Ltd. STAR-501 contains, as a major component, a multiple branched polyacrylate with dipentaerythritol as a core (dipentaerythritol hexaacrylate (DPHA) connected type) having an acrylate group at an end thereof. STAR-501 has a molecular weight of approximately from 16,000 to 24,000.

Metal Oxide Particles (b3)

Metal oxide particles (b3) are used in the present invention. The addition of the metal oxide particles (b3) may facilitate the control of the refractive index.

The metal oxide particles (b3) are not particularly limited, and examples thereof include fine particles of aluminum oxide, titanium oxide, antimony oxide, zirconium oxide, silicon oxide, cerium oxide, iron oxide, and a modified zirconium oxide-stannic oxide composite sol. The metal oxide may be used solely or as a combination of two or more kinds thereof.

Among these, fine particles of zirconium oxide are further preferably used from the standpoint of the weather resistance.

As the metal oxide particles (b3), metal oxide particles coated with a silane coupling agent are preferably contained. The use of the metal oxide particles coated with a silane coupling agent may enhance the transparency and the adhesion of the λ/4 layer.

The amount of the silane coupling agent used is preferably from 1.5 to 10% by mass, and more preferably from 3 to 8% by mass, based on the metal oxide particles (b3). When the amount thereof is 1.5% by mass or more, the compatibility with the components (b1) and (b2) may be enhanced, and the amount thereof is 10% by mass or less, the film hardness may be enhanced.

Additives

The λ/4 layer of the present invention may contain depending on necessity a reaction initiator for curing within a shorter period of time, and an organic solvent and a leveling agent for enhancing the wettability on coating the coating composition and enhancing the flatness of the cured film. Furthermore, an ultraviolet ray absorbent, an antioxidant, a light stabilizer and the like may also be added unless the properties of the cured film are impaired.

The amount of the bifunctional or higher functional acrylate compound (b1) mixed is preferably from 1 to 70% by mass, and more preferably from 1 to 40% by mass, based on the total λ/4 layer.

The amount of the dendritic aliphatic compound (b2) mixed is preferably from 5 to 50% by mass, and more preferably from 10 to 40% by mass, based on the total λ/4 layer.

The amount of the metal oxide particles (b3) mixed is preferably from 5 to 250 parts by mass, and more preferably from 30 to 200 parts by mass, per 100 parts by mass of the total amounts of the acrylate component (b1) and the component (b2).

The refractive index of the λ/4 layer is not particularly limited, and for example, is preferably from 1.50 to 1.70, and more preferably from 1.53 to 1.65.

The difference in refractive index between the plastic substrate (A) and the λ/4 layer (B) is preferably 0.14 or less, and more preferably 0.12 or less.

The λ/4 layer preferably satisfies the condition 1 and the condition 2 shown below from the standpoint of the notable prevention of the formation of interference fringes.

Condition 1

The refractive index $n_p$ of the λ/4 layer satisfies the following expression (I).

$$(n_s \cdot n_H)^{1/2} + |n_s - n_H|/4 \geq n_p \geq (n_s \cdot n_H)^{1/2} - |n_s - n_H|/4 \quad (I)$$

wherein $n_s$ represents the refractive index of the plastic substrate, and $n_H$ represents the refractive index of the hard coat layer.

Condition 2

The thickness d of the λ/4 layer satisfies the following expression (II).

$$d = \lambda/(4 n_p) \quad (II)$$

wherein λ represents the wavelength of visible light, which is from 450 to 650 nm.

Hard Coat Layer (C)

The hard coat layer (C) in the present invention is not particularly limited, and examples thereof include a thermosetting hard coat material and a photocurable hard coat material.

Examples of the thermosetting hard coat material include a silicone resin, such as organopolysiloxane, and a melamine resin. Examples of the silicone resin include a resin containing silica particles and a silane coupling agent, such as 3-glycidoxypropyltrimethoxysilane, and more specifically the organosilicon compound described in JP, 08-054501, A and the resin containing a silicate compound described in JP, 08-198985, A may be used.

The melamine resin is not particularly limited, and may be a hard coat layer obtained by drying and/or curing under heating a coating composition containing a melamine resin, such as methylated methylol melamine, propylated methylol melamine, butylated methylol melamine and isobutylated methylol melamine, with a crosslinking agent, a curing agent, and the like.

The photocurable hard coat material is not particularly limited, and examples thereof include a composition containing a polyfunctional acrylate compound. Examples of the polyfunctional acrylate used as the hard coat material include dipentaerythritol lactone-modified hexaacrylate, dipentaerythritol hexaacrylate, and dipentaerythritol pentaacrylate. The photocurable hard coat material may contain a metal oxide, such as silica particles.

The refractive index of the hard coat layer is not particularly limited, and for example, is preferably from 1.35 to 1.65, and more preferably from 1.45 to 1.55.

Impact Absorbing Layer (D)

In the present invention, an impact absorbing layer (D) is preferably provided between the λ/4 layer (B) and the hard coat layer (C). The impact absorbing layer (D) provided may enhance the adhesion between the hard coat layer (C) and the substrate, and thereby hard coat layers with larger kinds of materials may be applied.

The impact absorbing layer (D) preferably contains a urethane resin for providing higher adhesion. The urethane resin used in the impact absorbing layer (D) may be any of thermoplastic urethane and photocurable urethane.

Examples of the photocurable urethane used in the impact absorbing layer (D) include a polyfunctional urethane acrylate.

The impact absorbing layer (D) is preferably formed by coating a composition containing a dispersed thermoplastic urethane (d1) and a mixed solvent (d2) containing a solvent having a carbonyl group and an alcohol solvent, on the λ/4 layer to form a coated film, which is then dried. The use of the impact absorbing layer (D) that is formed by using the mixed solvent (d2) may enhance particularly the adhesion between the λ/4 layer and the impact absorbing layer.

Dispersed Thermoplastic Urethane (d1)

The dispersed thermoplastic urethane (d1) used may be a thermoplastic urethane resin dispersed in water.

Examples of the dispersed thermoplastic urethane (d1) include Superflex 126, Superflex 130, Superflex 150, Superflex 150HS, Superflex 170, Superflex 300, Superflex 420, Superflex 460, Superflex 470, Superflex 500M and Superflex 620, which are commercially available products produced by DKS Co., Ltd., and Evafanol 170, Evafanol N-33, Evafanol AP-6, Evafanol AP-12, Evafanol AP-24, Evafanol AL-3, Evafanol APC-55, Evafanol APC-66, Evafanol HA-100, Evafanol HA-11, Evafanol HA-15, Evafanol HA-50C, Evafanol HO-10, Evafanol HO-10PT, Evafanol H0-18, Evafanol N, Evafanol N-20, Evafanol N-7, Evafanol N-88, Evafanol AS-12, Evafanol AS-21 and Evafanol AS-47, which are commercially available products produced by Nicca Chemical Co., Ltd.

Mixed Solvent (d2)

The mixed solvent (d2) contains a solvent having a carbonyl group and an alcohol solvent. The solvent having a carbonyl group is used from the standpoint of the enhancement of the dispersibility and the permeation effect to the λ/4 layer of the urethane, and the alcohol solvent is used from the standpoint of the enhancement of the solubility of the urethane resin in the mixed solvent.

Examples of the solvent having a carbonyl group include an acetate solvent, such as 1-methoxypropan-2-yl acetate (PGMEA), ethyl acetate and butyl acetate, and a ketone solvent, such as methyl isobutyl ketone (MIBK) and methyl ethyl ketone (MEK). Among these, 1-methoxypropan-2-yl acetate (PGMEA) is preferred from the standpoint of the enhancement of the dispersibility of the thermoplastic urethane.

Examples of the alcohol solvent include propylene glycol monomethyl ether (PGM), methanol, ethanol, propanol and butanol. Among these, propylene glycol monomethyl ether (PGM) is preferred.

The volume ratio of the solvent having a carbonyl group and the alcohol solvent (solvent having a carbonyl group/alcohol solvent) is preferably from 20/80 to 80/20, more preferably from 30/70 to 70/30, and further preferably from 40/60 to 60/40, from the standpoint of the enhancement of the adhesion.

The refractive index of the impact absorbing layer is not particularly limited, and for example, is preferably from 1.35 to 1.65, and more preferably from 1.45 to 1.55. The refractive index of the impact absorbing layer is preferably substantially the same as the hard coat layer. The term, substantially the same, referred herein means that the difference in refractive index is 0.01 or less.

The thickness of the impact absorbing layer is not particularly limited, and for example, is preferably from 0.2 to 3 μm, and more preferably from 0.4 to 2 μm.

Layer Structure

The plastic lens of the present invention contains at least the plastic substrate (A), the λ/4 layer (B) formed on the plastic substrate, and the hard coat layer (C) formed on the λ/4 layer directly or through another layer. The plastic lens preferably has the impact absorbing layer (D) between the λ/4 layer (B) and the hard coat layer (C). The surfaces of the layers may be subjected to a surface treatment, such as a plasma treatment, for enhancing the adhesion among the layers.

For example, in the case where the plastic lens of the present invention has the plastic substrate (A), the λ/4 layer (B), the impact absorbing layer (D), and the hard coat layer (C), which are formed in this order, the impact absorbing layer (D) is preferably formed with any of a thermoplastic urethane and a photocurable urethane. In the case where the impact absorbing layer (D) is a urethane resin in this layer structure, the hard coat layer (C) has many urethane bonds on the surface thereof, and therefore any of a thermosetting hard coat material and a photocurable hard coat material is preferably used from the standpoint of the adhesion.

For example, in the case where the plastic lens of the present invention has the plastic substrate (A), the λ/4 layer (B), and the hard coat layer (C), which are formed in this order, a thermosetting hard coat material or a photocurable hard coat material may be used for the hard coat layer (C), and a photocurable hard coat material is preferably used for achieving high adhesion to the adjacent λ/4 layer (B).

Method for Producing Plastic Lens

The method for producing a plastic lens of the present invention includes the following steps (1) and (2):

step (1): forming a λ/4 layer (B) having a thickness of from 50 to 100 nm by coating a composition containing a bifunctional or higher functional acrylate compound, a dendritic aliphatic compound having an acrylate group at an end thereof, and metal oxide particles, on a plastic substrate (A), and then curing the composition through irradiation of an ultraviolet ray; and step (2): forming a hard coat layer (C) on the λ/4 layer (B) formed in the step (1).

According to the method of the present invention, a hard coat layer may be formed with good productivity in a shortened production tact.

Step (1)

In the step (1), a composition containing a bifunctional or higher functional acrylate compound (b1), a dendritic aliphatic compound having an acrylate group at an end thereof (b2), and metal oxide particles (b3) is coated on a plastic substrate (A), and then cured through irradiation of an ultraviolet ray, so as to form a λ/4 layer (B) having a thickness of from 50 to 100 nm.

The composition used in the step (1) may be produced by mixing and stirring the component (b1), the component (b2), the component (b3), and depending on necessity, an additive.

An organic solvent is preferably used on mixing and stirring, and specific examples thereof used include methyl ethyl ketone, 1-methoxypropan-2-yl acetate (PGMEA) and propylene glycol monomethyl ether (PGM).

The solid content of the composition used in the step (1) in the case where the organic solvent is used is preferably from 0.01 to 10% by mass, more preferably from 0.1 to 5% by mass, and further preferably from 0.5 to 3% by mass, based on the total composition, from the standpoint of the suitable thickness provided, and for the dispersion stability of the metal oxide particles and the uniform coating on the plastic substrate.

In the step (1), the coating method of the composition is not particularly limited, and the composition may be coated by a known method, such as a spin coating method and a dip coating method, and is preferably coated by a spin coating method.

The composition used in the step (1) may suppress maximally curing shrinkage on irradiation of an ultraviolet ray, and suppresses oxygen inhibition, thereby forming a λ/4 layer having high hardness and adhesion to the substrate.

Step (2)

In the step (2), the coating method of the composition is not particularly limited, and the composition may be coated by a known method, such as a spin coating method and a dip coating method.

Step (3)

The method for producing a plastic lens of the present invention preferably further includes the following step (3) between the step (1) and the step (2). In the case where the method includes the step (3), the step (2) is a step of forming the hard coat layer on an impact absorbing layer (D):

step (3): forming an impact absorbing layer (D) on the λ/4 layer (B) formed in the step (1).

In the step (3), the impact absorbing layer (D) is preferably formed by forming a coated film with a composition including a dispersed thermoplastic urethane and a mixed solvent containing a solvent having a carbonyl group and an alcohol solvent, and then dried, for enhancing the adhesion to the λ/4 layer (B).

In the step (3), the use of the prescribed mixed solvent may enhance the adhesion of the impact absorbing layer (D) to the λ/4 layer (B). While the mechanism of the effect is not necessarily clear, it is considered that the use of the solvent having a carbonyl group enhances the dispersibility of the thermoplastic urethane to reduce the particle diameter of the dispersed urethane, and thereby the permeability thereof to the λ/4 layer is enhanced.

In the step (3), the coating method of the composition is not particularly limited, and the composition may be coated by a known method, such as a spin coating method and a dip coating method.

The plastic lens of the present invention may be used, for example, as a plastic lens of spectacles, cameras and the like, and may be preferably used as a plastic lens for spectacles.

EXAMPLE

The present invention will be described in more detail with reference to examples, but the present invention is not limited to the examples. In the examples, part by mass may be expressed simply by part, and percentage by mass may be expressed simply by percentage.

In Examples and Comparative Examples, the following materials were used.

Plastic Substrate (A)

Substrate A: refractive index: 1.60 (material: thermosetting polythiourethane resin)

Substrate B: refractive index: 1.67 (material: thermosetting polythiourethane resin)

Substrate C: refractive index: 1.70 (material: thermosetting polysulfide resin)

Substrate D: refractive index: 1.74 (material: thermosetting polysulfide resin)

λ/4 Layer (B)

(b1) Bifunctional or Higher Functional Acrylate Compound

M-306 (a trade name, produced by Toagosei Co., Ltd., pentaerythritol acrylate (mixture containing from 65 to 70% of triacrylate (one hydroxyl group per one molecule)))

Beamset 50411 (produced by Arakawa Chemical Industries, Ltd., bifunctional urethane acrylate)

UX5000 (produced by Nippon Kayaku Co., Ltd., pentafunctional urethane acrylate)

(b2) Dendritic Aliphatic Compound

SIRIUS (SIRIUS-501, a trade name, produced by Osaka Organic Chemical Industry, Ltd.)

V1000 (Viscoat #1000, a trade name, produced by Osaka Organic Chemical Industry, Ltd.)

(b3) Metal Oxide Particles

Zirconia sol (HZ-407MH, a trade name, produced by Nissan Chemical Industries, Ltd.)

Hard Coat Layer (C)

Thermosetting hard coat (which is referred simply as "thermosetting" in the tables): mixture of silica fine particles (PGM-ST, a trade name, produced by Nissan Chemical Industries, Ltd.) and 3-glycidoxypropyltrimethoxysilane (KBM403, a trade name, produced by Shin-Etsu Chemical Co., Ltd.)

UV-curable hard coat 1 (which is referred simply as "photocurable 1" in the tables): dipentaerythritol lactone-modified hexaacrylate (DPCA60, a trade name, produced by Nippon Kayaku Co., Ltd.)

UV-curable hard coat 2 (which is referred simply as "photocurable 2" in the tables): mixture of a mixture of dipentaerythritol hexaacrylate and pentaacrylate (KAYARAD DPHA, a trade name, produced by Nippon Kayaku Co., Ltd.) and silica fine particles (PGM-ST) coated with 3-glycidoxypropyltrimethoxysilane (KBM403)

Impact Absorbing Layer (D)

Thermoplastic impact absorbing layer (which is referred simply as "thermoplastic" in the tables): polyurethane emulsion (Evafanol 170, a trade name, produced by Nicca Chemical Co., Ltd.)

UV-curable impact absorbing layer (which is referred simply as "photocurable" in the tables): bifunctional urethane acrylate (Beamset 50411, a trade name, produced by Arakawa Chemical Industries, Ltd.)

Example 1

1 part by mass of the bifunctional or higher functional acrylate compound (b1) (M-306) and 1 part by mass of the dendritic aliphatic compound (b2) (V1000) were mixed with 0.8 part by mass of the zirconia sol (b3), and stirred. Thereafter, 0.001 part by mass of a leveling agent (L-7604, a trade name, produced by Dow Corning Toray Co., Ltd.) and 0.05 part by mass of a reaction initiator (Irgacure 127, a trade name, produced by Ciba Specialty Chemicals Co., Ltd.) were added thereto, and diluted with propylene glycol monomethyl ether (PGM) to a solid content of 1.6% by mass, followed by stirring, so as to prepare a coating composition.

By using the coating composition solution obtained above, the composition shown in the table was coated on a plastic substrate (substrate A) by a spin coater (produced by Mikasa Co., Ltd.).

The coated film was cured by irradiating the substrate having the coating liquid coated thereon with an ultraviolet ray by using F300S (model name, produced by Fusion UV Systems, Inc.), thereby forming a λ/4 layer. Nitrogen purge was performed on irradiating with an ultraviolet ray, the thickness of the λ/4 layer was 86 nm, and the curing time was 5 seconds. The surface of the resulting λ/4 layer was touched to confirm that the surface had no tackiness (tack-free).

The dispersed thermoplastic urethane (Superflex 420, produced by DKS Co., Ltd.) was diluted with a mixed solvent of 1-methoxypropan-2-yl acetate (PGMEA) and propylene glycol monomethyl ether (PGM) (mass ratio: 3/7) to a solid content of 8% by mass, followed by stirring, so as to prepare a composition for forming an impact absorbing layer (D). The composition for forming an impact absorbing layer (D) was coated on the λ/4 layer (B) thus formed, by a dipping method, and dried.

Thereafter, 0.8 part by mass of silica fine particles (PGM-ST, produced by Nissan Chemical Industries, Ltd.), 1 part by mass of silane coupling agent (KBM403, produced by Shin-Etsu Chemical Co., Ltd.), 0.03 part by mass of alumina chelate (A(W), produced by Kawaken Fine Chemicals Co., Ltd.), 0.1% by mass based on the total composition of a leveling agent (Y7006, Dow Corning Toray Co., Ltd.), and PGM were mixed to prepare a composition for forming a thermosetting hard coat layer. The hard coat layer was coated by dipping method to form a coated film, which was then cured to form a hard coat layer, and thus a plastic lens according to the present invention was provided. The evaluation results are shown in Table 1.

Examples 2 to 4

Plastic lenses of the present invention were obtained by forming the layers in the same manner as in Example 1 except that the kind of the substrate and the composition for forming the λ/4 layer were changed to those shown in Table 1. The evaluation results are shown in Table 1.

Comparative Examples 1 to 4

A plastic lens of Comparative Example 1 was obtained by forming the layers in the same manner as in Example 1 except that the λ/4 layer was not formed. Plastic lenses of Comparative Examples 2 to 4 were obtained by forming the layers in the same manner as in Comparative Example 1 except that the kind of the substrate was changed to those shown in Table 2. The results thereof are shown in Table 2.

Examples 5 to 8

In Examples 5 to 8, plastic lenses were obtained by making the following changes. The evaluation results thereof are shown in Table 3.

Example 5

The hard coat layer in Example 1 was changed from the thermosetting hard coat to a UV-curable hard coat.

Example 6

The impact absorbing layer in Example 5 was not formed, and changed to the UV-curable hard coat 2.

Example 7

The thermoplastic impact absorbing layer in Example 5 was changed to the UV-curable impact absorbing layer.

Example 8

The substrate A in Example 6 was changed to the substrate D, and the λ/4 layer had the composition shown in Table 3.

Examples 9 and 10 and Comparative Examples 5 and 6

In Examples 9 and 10 and Comparative Examples 5 and 6, plastic lenses were obtained by making the following changes. The evaluation results thereof are shown in Table 4.

Example 9

The thickness of λ/4 layer in Example 1 was changed from 86 nm to 55 nm.

Example 10

The thickness of λ/4 layer in Example 1 was changed from 86 nm to 98 nm.

Comparative Example 5

The thickness of λ/4 layer in Example 1 was changed from 86 nm to 46 nm.

Comparative Example 6

The thickness of λ/4 layer in Example 1 was changed from 86 nm to 104 nm.

Comparative Examples 7 to 10

Plastic lenses were obtained by forming the layers in the same manner as in Example 1 except that the kind of the substrate and the composition for forming the λ/4 layer were changed to those shown in Table 5. The evaluation results are shown in Table 5.

In Examples and Comparative Examples, the evaluations were performed in the following manners.

Evaluation of Adhesion

The surface of the plastic lens obtained in the aforementioned method was cross-cut with a distance of 1.5 mm to form 100 cells. An adhesive tape (Cellotape, a registered trade name, produced by Nichiban Co., Ltd.) was firmly adhered to the cross-cut portion, and after quickly peeling the adhesive tape therefrom, the presence of delamination of the cured films was observed.

A case where no delamination occurred was evaluated as 100/100, and a case where all cells were delaminated was evaluated as 0/100.

Evaluation of Interference Fringes

Interference fringes were evaluated by visual observation of the appearance. A case where substantially no interference fringe was observed was evaluated as A, a case where slight interference fringes were observed was evaluated as B, a case where interference fringes were observed was evaluated as C, and a case where interference fringes were clearly observed was evaluated as D.

TABLE 1

|  |  |  | Example 1 | Example 2 | Example 3 | Example 4 |
|---|---|---|---|---|---|---|
| Substrate (A) | Kind | | substrate A | substrate B | substrate C | substrate D |
|  | Refractive index | | 1.60 | 1.67 | 1.70 | 1.74 |
| λ/4 layer (B) | (b1) | M-306 504H | 1 part | 1 part |  |  |
|  |  | UX5000 |  |  | 1 part | 7 parts |
|  | (b2) | SIRIUS (NV = 50%) |  |  | 8 parts | 6 parts |
|  |  | V1000 | 1 part | 1 part |  |  |
|  | (b3) | Zirconia sol | 0.8 part | 1.6 parts | 14.4 parts | 26 parts |
|  | Solid content (diluted with PGM) | | 1.6% | 1.8% | 2% | 2.2% |
|  | Thickness | | 86 nm | 86 nm | 86 nm | 86 nm |
|  | Refractive index | | 1.54 | 1.58 | 1.60 | 1.62 |
| Impact absorbing layer (D) | Kind | | thermoplastic | thermoplastic | thermoplastic | thermoplastic |
|  | Refractive index | | 1.50 | 1.50 | 1.50 | 1.50 |
| Hard coat layer (C) | Kind | | thermosetting | thermosetting | thermosetting | thermosetting |
|  | Refractive index | | 1.50 | 1.50 | 1.50 | 1.50 |
| Evaluation | Adhesion | | 100/100 | 100/100 | 100/100 | 100/100 |
|  | Appearance (interference fringes) | | A | A | A | A |

TABLE 2

|  |  | Comparative Example 1 | Comparative Example 2 | Comparative Example 3 | Comparative Example 4 |
|---|---|---|---|---|---|
| Substrate (A) | Kind | substrate A | substrate B | substrate C | substrate D |
|  | Refractive index | 1.60 | 1.67 | 1.70 | 1.74 |
|  | λ/4 layer (B) | none | none | none | none |
| Impact absorbing layer (D) | Kind | thermoplastic | thermoplastic | thermoplastic | thermoplastic |
|  | Refractive index | 1.50 | 1.50 | 1.50 | 1.50 |
| Hard coat layer (C) | Kind | thermosetting | thermosetting | thermosetting | thermosetting |
|  | Refractive index | 1.50 | 1.50 | 1.50 | 1.50 |
| Evaluation | Adhesion | 100/100 | 100/100 | 100/100 | 100/100 |
|  | Appearance (interference fringes) | C | C | D | D |

TABLE 3

|  |  |  | Example 5 | Example 6 | Example 7 | Example 8 |
|---|---|---|---|---|---|---|
| Substrate (A) | Kind | | substrate A | substrate A | substrate A | substrate D |
|  | Refractive index | | 1.60 | 1.60 | 1.60 | 1.74 |
| λ/4 layer (B) | (b1) | M-306 | 1 part | 1 part | 1 part |  |
|  |  | UX5000 |  |  |  | 7 parts |
|  | (b2) | SIRIUS (NV = 50%) |  |  |  | 6 parts |
|  |  | V1000 | 1 part | 1 part | 1 part |  |
|  | (b3) | Zirconia sol | 0.8 part | 0.8 part | 0.8 part | 26 parts |
|  | Solid content (diluted with PGM) | | 1.6% | 1.6% | 1.6% | 2.2% |
|  | Thickness | | 86 nm | 86 nm | 86 nm | 86 nm |
|  | Refractive index | | 1.54 | 1.54 | 1.54 | 1.62 |
| Impact absorbing layer (D) | Kind | | thermoplastic | none | photocurable | none |
|  | Refractive index | | 1.50 | — | 1.50 | — |
| Hard coat layer (C) | Kind | | photocurable 1 | photocurable 2 | photocurable 1 | photocurable 2 |
|  | Refractive index | | 1.50 | 1.50 | 1.50 | 1.50 |
| Evaluation | Adhesion | | 100/100 | 100/100 | 100/100 | 100/100 |
|  | Appearance (interference fringes) | | A | B | A | B |

TABLE 4

|  |  |  | Example 9 | Example 10 | Comparative Example 5 | Comparative Example 6 |
|---|---|---|---|---|---|---|
| Substrate (A) | Kind | | substrate A | substrate A | substrate A | substrate A |
|  | Refractive index | | 1.60 | 1.60 | 1.60 | 1.60 |
| λ/4 layer (B) | (b1) | M-306 | 1 part | 1 part | 1 part | 1 part |
|  | (b2) | V1000 | 1 part | 1 part | 1 part | 1 part |
|  | (b3) | Zirconia sol | 0.8 part | 0.8 part | 0.8 part | 0.8 part |
|  | Solid content (diluted with PGM) | | 1.4% | 1.8% | 1.3% | 1.9% |
|  | Thickness | | 55 nm | 98 nm | 46 nm | 104 nm |
|  | Refractive index | | 1.54 | 1.54 | 1.54 | 1.54 |
| Impact absorbing layer (D) | Kind | | thermoplastic | thermoplastic | thermoplastic | thermoplastic |
|  | Refractive index | | 1.50 | 1.50 | 1.50 | 1.50 |

TABLE 4-continued

|  |  | Example 9 | Example 10 | Comparative Example 5 | Comparative Example 6 |
|---|---|---|---|---|---|
| Hard coat layer (C) | Kind | thermosetting | thermosetting | thermosetting | thermosetting |
|  | Refractive index | 1.50 | 1.50 | 1.50 | 1.50 |
| Evaluation | Adhesion | 100/100 | 100/100 | 100/100 | 100/100 |
|  | Appearance (interference fringes) | B | B | C | C |

TABLE 5

|  |  |  | Comparative Example 7 | Comparative Example 8 | Comparative Example 9 | Comparative Example 10 |
|---|---|---|---|---|---|---|
| Substrate (A) | Kind |  | substrate D | substrate C | substrate B | substrate A |
|  | Refractive index |  | 1.74 | 1.70 | 1.67 | 1.60 |
| λ/4 layer (B) | (b1) | M-306 | — | — | 1 part | 1 part |
|  |  | 504H | — | 1 part | — | — |
|  |  | UX5000 | 1 part | — | — | — |
|  | (b2) |  | — | — | — | — |
|  | (b3) | Zirconia sol | 2.0 parts | 1.6 part | 0.8 part | 0.4 part |
|  | Solid content (diluted with PGM) |  | 2.1% | 2% | 1.8% | 1.6% |
|  | Thickness |  | 86 nm | 86 nm | 86 nm | 86 nm |
|  | Refractive index |  | 1.62 | 1.60 | 1.58 | 1.54 |
| Impact absorbing layer (D) | Kind |  | thermoplastic | thermoplastic | thermoplastic | thermoplastic |
|  | Refractive index |  | 1.50 | 1.50 | 1.50 | 1.50 |
| Hard coat layer (C) | Kind |  | thermosetting | thermosetting | thermosetting | thermosetting |
|  | Refractive index |  | 1.50 | 1.50 | 1.50 | 1.50 |
| Evaluation | Adhesion |  | 0/100 | 0/100 | 70/100 | 80/100 |
|  | Appearance (interference fringes) |  | A | A | A | A |

As described above, according to the plastic lens of the present invention, such a plastic lens may be obtained that has a λ/4 layer, is suppressed in interference fringes to provide good appearance, and has excellent adhesion between a plastic substrate and a hard coat layer.

The λ/4 layer of the plastic lens of the present invention exhibits high adhesion irrespective of such a thin film as having a thickness of 1 μm or less. In comparison between Examples and Comparative Examples 7 to 10, it is understood that high adhesion is exhibited due to the component (b2) contained in the λ/4 layer.

The invention claimed is:

1. A plastic lens comprising:
   a plastic substrate (A);
   a λ/4 layer (B) that is formed on the plastic substrate, is formed by curing a composition comprising a bifunctional or higher functional acrylate compound, a dendritic aliphatic compound having an acrylate group at an end thereof, and metal oxide particles, and has a thickness of from 50 to 100 nm; and
   a hard coat layer (C) that is formed on the λ/4 layer directly or through another layer.

2. The plastic lens according to claim 1, wherein the plastic lens further comprises an impact absorbing layer (D) between the λ/4 layer (B) and the hard coat layer (C).

3. The plastic lens according to claim 1 wherein the plastic substrate (A) has a refractive index of from 1.58 to 1.76, and a difference in refractive index between the plastic substrate (A) and the λ/4 layer (B) is 0.14 or less.

4. A method for producing a plastic lens, comprising the following steps (1) and (2):
   step (1): forming a λ/4 layer (B) having a thickness of from 50 to 100 nm by coating a composition comprising a bifunctional or higher functional acrylate compound, a dendritic aliphatic compound having an acrylate group at an end thereof, and metal oxide particles, on a plastic substrate (A), and then curing the composition through irradiation of an ultraviolet ray; and
   step (2): forming a hard coat layer (C) on the λ/4 layer (B) formed in the step (1).

5. The method for producing a plastic lens according to claim 4,
   wherein the method further comprises the following step (3) between the step (1) and the step (2), and the step (2) is a step of forming the hard coat layer (C) on an impact absorbing layer (D):
   step (3): forming an impact absorbing layer (D) on the λ/4 layer (B) formed in the step (1).

* * * * *